US012500432B2

(12) United States Patent
Kim et al.

(10) Patent No.: US 12,500,432 B2
(45) Date of Patent: Dec. 16, 2025

(54) ENERGY STORAGE SYSTEM INCLUDING NEWLY INSTALLED BATTERY RACKS AND METHOD FOR CONTROLLING THE SAME (71) Applicant: LG ENERGY SOLUTION, LTD., Seoul (KR)

(72) Inventors: Jongcheol Kim, Daejeon (KR); Byeongho Mun, Daejeon (KR); Inho Jung, Daejeon (KR); Hyeungil Jo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 248 days.

(21) Appl. No.: 17/939,581

(22) Filed: Sep. 7, 2022

(65) Prior Publication Data
US 2023/0071916 A1 Mar. 9, 2023

(30) Foreign Application Priority Data
Sep. 8, 2021 (KR) .................. 10-2021-0119406

(51) Int. Cl.
*H02J 7/00* (2006.01)
*H01M 10/44* (2006.01)
(Continued)

(52) U.S. Cl.
CPC .......... *H02J 7/0048* (2020.01); *H02J 7/0029* (2013.01); *H02J 7/005* (2020.01); *H02J 7/00712* (2020.01);
(Continued)

(58) Field of Classification Search
CPC ........ H02J 7/0048; H02J 7/0029; H02J 7/005; H02J 7/00714; H02J 7/007194
(Continued)

(56) References Cited

U.S. PATENT DOCUMENTS 4,127,782 A * 11/1978 Omura ................ B60R 16/0307
307/66
7,042,115 B2 * 5/2006 Mizutani ............. F02N 11/0866
307/10.6
(Continued)

FOREIGN PATENT DOCUMENTS

EP 3 795 412 A1 3/2021
JP 2013/34333 A 2/2013
(Continued)

OTHER PUBLICATIONS

Japanese Office Action for Japanese Application No. 2023-539369, dated Jun. 17, 2024, with English translation.
(Continued)

*Primary Examiner* — John T Trischler
(74) *Attorney, Agent, or Firm* — Birch, Stewart, Kolasch & Birch, LLP (57) ABSTRACT An energy storage system can include a plurality of first battery racks, a plurality of battery protection units configured to manage the plurality of first battery racks respectively, a plurality of second battery racks, a plurality of DC/DC converters configured to manage the plurality of second battery racks respectively, and a battery section controller configured to monitor outputs of the plurality of battery protection units and outputs of the plurality of DC/DC converters, and to control the outputs of the plurality of DC/DC converters.

19 Claims, 6 Drawing Sheets (51) Int. Cl.
   *H01M 10/48* (2006.01)
   *H02J 3/32* (2006.01)
   *H02J 3/46* (2006.01)
   *H02J 7/34* (2006.01)

(52) U.S. Cl.
   CPC .... *H02J 7/00714* (2020.01); *H02J 7/007194* (2020.01); *H01M 10/441* (2013.01); *H01M 10/482* (2013.01); *H02J 3/32* (2013.01); *H02J 3/46* (2013.01); *H02J 7/00047* (2020.01); *H02J 7/0013* (2013.01); *H02J 7/342* (2020.01); *H02J 2207/20* (2020.01)

(58) Field of Classification Search
   USPC ........................................................ 320/128
   See application file for complete search history.

(56) References Cited

U.S. PATENT DOCUMENTS

| | | | | |
|---|---|---|---|---|
| 8,138,720 B2* | 3/2012 | Snyder | .................... | B60L 58/20 307/53 |
| 8,384,244 B2* | 2/2013 | Peterson | .................... | G06F 1/30 307/64 |
| 8,490,593 B2* | 7/2013 | Yang | .................... | F02P 3/096 123/179.5 |
| 8,645,049 B2* | 2/2014 | Izumi | .................... | F02D 29/02 701/113 |
| 8,723,473 B2* | 5/2014 | Xu | .................... | B60L 8/003 320/101 |
| 9,030,165 B2* | 5/2015 | Kawai | .................... | H02J 7/1446 320/155 |
| 9,555,717 B2* | 1/2017 | Nakaya | .................... | G06Q 50/06 |
| 9,748,617 B2* | 8/2017 | Nakaya | .................... | H01M 10/482 |
| 9,849,793 B2* | 12/2017 | Tashiro | .................... | B60L 58/25 |
| 9,954,368 B2* | 4/2018 | Kang | .................... | H02J 3/32 |
| 10,020,665 B2* | 7/2018 | Uan-Zo-Li | .................... | H02J 7/00047 |
| 10,074,882 B2* | 9/2018 | Nakaya | .................... | B60L 58/10 |
| 10,084,314 B2* | 9/2018 | Ito | .................... | H02J 3/381 |
| 10,097,021 B2* | 10/2018 | Horie | .................... | H02J 7/0042 |
| 10,205,327 B2* | 2/2019 | Okui | .................... | H02J 7/0025 |
| 10,284,009 B2* | 5/2019 | Park | .................... | H02J 7/00 |
| 10,312,557 B2 | 6/2019 | Nakaya | | |
| 10,848,098 B2* | 11/2020 | Agarwal | .................... | H01M 10/441 |
| 10,910,870 B2* | 2/2021 | Horie | .................... | H02J 7/0042 |
| 10,958,086 B2* | 3/2021 | Yang | .................... | H02J 7/0013 |
| 10,992,165 B2* | 4/2021 | Matsushita | .................... | H02J 9/00 |
| 11,056,886 B2* | 7/2021 | Kato | .................... | H02J 7/02 |
| 11,135,932 B2* | 10/2021 | Ishida | .................... | B60L 53/16 |
| 11,215,156 B2* | 1/2022 | Ciaccio | .................... | H02J 7/342 |
| 11,245,268 B1* | 2/2022 | Trippel | .................... | H02J 7/0013 |
| 11,329,327 B2* | 5/2022 | Nishikawa | .................... | H02J 7/02 |
| 11,349,332 B2* | 5/2022 | Waite | .................... | H01M 10/44 |
| 11,350,541 B2* | 5/2022 | Nakaya | .................... | H02J 7/0063 |
| 11,394,236 B2* | 7/2022 | Wyma | .................... | H02J 7/0013 |
| 11,404,888 B2* | 8/2022 | Isaksson | .................... | B60L 53/22 |
| 11,404,899 B2* | 8/2022 | Nishikawa | .................... | H01M 10/425 |
| 11,466,656 B2* | 10/2022 | Ciaccio | .................... | B60L 1/02 |
| 11,685,289 B2* | 6/2023 | Gao | .................... | H02J 7/007182 701/22 |
| 11,705,741 B2* | 7/2023 | Trippel | .................... | H02J 7/0063 320/112 |
| 11,735,930 B2* | 8/2023 | Choi | .................... | H02J 7/0048 320/134 |
| 11,923,714 B2* | 3/2024 | Hara | .................... | H02J 7/007182 |
| 11,967,847 B2* | 4/2024 | Yoon | .................... | H01M 50/204 |
| 12,003,130 B2* | 6/2024 | Zhou | .................... | H02J 7/0018 |
| 12,095,268 B2* | 9/2024 | Cai | .................... | H02J 7/005 |
| 12,126,204 B2* | 10/2024 | Sharma | .................... | H02J 7/005 |
| 12,170,451 B2* | 12/2024 | Qvintus | .................... | H02J 3/32 |
| 2003/0160510 A1* | 8/2003 | Mizutani | .................... | F02N 11/14 307/10.1 |
| 2005/0151513 A1* | 7/2005 | Cook | .................... | H02J 7/1423 320/137 |
| 2009/0212626 A1 | 8/2009 | Snyder et al. | | |
| 2011/0049910 A1* | 3/2011 | Izumi | .................... | B60W 20/00 290/38 R |
| 2011/0156620 A1* | 6/2011 | Yeh | .................... | H02J 7/1492 307/10.7 |
| 2011/0304211 A1* | 12/2011 | Peterson | .................... | G06F 1/30 307/65 |
| 2012/0112684 A1* | 5/2012 | Xu | .................... | B60L 53/22 320/101 |
| 2013/0033793 A1 | 2/2013 | Takeda | | |
| 2013/0082517 A1* | 4/2013 | Kawai | .................... | H02J 7/0071 307/9.1 |
| 2014/0152100 A1* | 6/2014 | Lim | .................... | H02J 7/0029 307/18 |
| 2014/0301000 A1* | 10/2014 | Takahashi | .................... | H01M 10/482 361/42 |
| 2014/0320144 A1* | 10/2014 | Nakaya | .................... | G06Q 50/06 324/434 |
| 2014/0347013 A1 | 11/2014 | Kim | | |
| 2015/0035359 A1* | 2/2015 | Chung | .................... | H02J 3/32 307/23 |
| 2015/0340897 A1* | 11/2015 | Uan-Zo-Li | .................... | H02J 7/00036 320/103 |
| 2016/0126741 A1 | 5/2016 | Ito | | |
| 2016/0226268 A1 | 8/2016 | Okui | | |
| 2016/0233699 A1* | 8/2016 | Kang | .................... | H02J 7/04 |
| 2016/0236581 A1* | 8/2016 | Tashiro | .................... | B60L 7/14 |
| 2017/0062883 A1* | 3/2017 | Nakaya | .................... | G01R 31/382 |
| 2017/0063123 A1* | 3/2017 | Horie | .................... | H02J 7/00712 |
| 2017/0093187 A1* | 3/2017 | Park | .................... | H02J 3/381 |
| 2017/0093207 A1* | 3/2017 | Park | .................... | H02J 9/061 |
| 2017/0324124 A1* | 11/2017 | Nakaya | .................... | B60L 58/12 |
| 2017/0358987 A1* | 12/2017 | Oouchi | .................... | B60L 53/22 |
| 2017/0366023 A1 | 12/2017 | Tanaka et al. | | |
| 2018/0167028 A1 | 6/2018 | Agarwal | | |
| 2018/0252195 A1* | 9/2018 | Ciaccio | .................... | H01M 10/635 |
| 2018/0252774 A1* | 9/2018 | Ciaccio | .................... | G01R 31/388 |
| 2018/0301770 A1* | 10/2018 | Nakaya | .................... | G01R 31/392 |
| 2018/0366967 A1* | 12/2018 | Horie | .................... | H02J 7/007182 |
| 2019/0103761 A1 | 4/2019 | Wyma | | |
| 2019/0210481 A1* | 7/2019 | Ishida | .................... | B60L 53/62 |
| 2019/0237980 A1 | 8/2019 | Yang | | |
| 2019/0312449 A1* | 10/2019 | Matsushita | .................... | H02J 1/08 |
| 2020/0127458 A1* | 4/2020 | Kato | .................... | H01M 10/425 |
| 2020/0176829 A1* | 6/2020 | Nishikawa | .................... | H01M 10/441 |
| 2020/0381928 A1* | 12/2020 | Isaksson | .................... | H01M 10/658 |
| 2021/0135484 A1* | 5/2021 | Waite | .................... | H02J 7/345 |
| 2021/0152009 A1* | 5/2021 | Hara | .................... | G01R 31/396 |
| 2021/0168964 A1 | 6/2021 | Nakaya | | |
| 2021/0194255 A1* | 6/2021 | Choi | .................... | H02J 7/0048 |
| 2021/0265856 A1* | 8/2021 | Nishikawa | .................... | H01M 10/44 |
| 2022/0029429 A1* | 1/2022 | Trippel | .................... | H02J 7/0014 |
| 2022/0131391 A1* | 4/2022 | Trippel | .................... | H02J 7/00032 |
| 2022/0140618 A1 | 5/2022 | Yoon et al. | | |
| 2022/0166231 A1* | 5/2022 | Qvintus | .................... | H02J 3/32 |
| 2022/0166233 A1* | 5/2022 | Pizzurro | .................... | H02J 7/0031 |
| 2022/0181906 A1* | 6/2022 | Wyma | .................... | H02J 7/005 |
| 2022/0200314 A1* | 6/2022 | Zhou | .................... | H02S 40/38 |
| 2022/0302724 A1* | 9/2022 | Sharma | .................... | H02J 7/0048 |
| 2022/0376489 A1* | 11/2022 | Kim | .................... | H02J 7/0031 |
| 2022/0385097 A1* | 12/2022 | Lim | .................... | H02J 7/02 |
| 2023/0035744 A1* | 2/2023 | Gao | .................... | B60L 53/53 |
| 2023/0133126 A1* | 5/2023 | Ayad | .................... | B60L 58/10 320/118 |
| 2023/0152376 A1* | 5/2023 | Imanaka | .................... | B60L 3/04 324/415 |
| 2023/0179002 A1* | 6/2023 | Tyagi | .................... | H02J 7/0048 |
| 2023/0216325 A1* | 7/2023 | Yoshiaki | .................... | H02J 7/0013 320/126 |
| 2023/0238803 A1* | 7/2023 | Cai | .................... | H02J 7/0048 307/46 |
| 2023/0261487 A1* | 8/2023 | Cai | .................... | B60L 58/21 320/128 |
| 2023/0268754 A1* | 8/2023 | Kim | .................... | H02J 7/00714 320/132 |
| 2023/0275437 A1* | 8/2023 | Kim | .................... | H02J 7/0013 307/31 |

(56) References Cited

U.S. PATENT DOCUMENTS

| | | | |
|---|---|---|---|
| 2023/0283188 A1* | 9/2023 | Kim | H02M 3/33573 |
| | | | 320/128 |
| 2023/0378768 A1* | 11/2023 | Kim | H02J 7/0031 |
| 2024/0030710 A1* | 1/2024 | Jo | H02J 7/0048 |
| 2024/0088697 A1* | 3/2024 | Zhou | H02J 7/0031 |
| 2024/0136821 A1* | 4/2024 | Kim | H02J 3/32 |
| 2024/0146069 A1* | 5/2024 | Zhang | H02J 3/381 |
| 2024/0149708 A1* | 5/2024 | Archer | B60L 50/64 |
| 2024/0154423 A1* | 5/2024 | Mun | G01R 31/40 |
| 2024/0154446 A1* | 5/2024 | Nakajima | H02J 7/007186 |
| 2024/0154454 A1* | 5/2024 | Choi | H02J 7/35 |
| 2024/0186791 A1* | 6/2024 | Chen | H02M 3/33584 |

FOREIGN PATENT DOCUMENTS

| | | |
|---|---|---|
| JP | 2014-230488 A | 12/2014 |
| JP | 2017-147898 A | 8/2017 |
| JP | 6430775 B2 | 11/2018 |
| JP | WO2019/207852 A1 | 6/2021 |
| KR | 10-2010-0133993 A | 12/2010 |
| KR | 10-1299269 B1 | 8/2013 |
| KR | 10-2016-0094228 A | 8/2016 |
| KR | 10-2017-0036328 A | 4/2017 |
| KR | 10-2018-009569 A | 1/2018 |
| KR | 10-2018-0079769 A | 7/2018 |
| KR | 10-1923958 A | 11/2018 |
| KR | 10-2063692 B1 | 1/2020 |
| KR | 10-2020-0112248 A | 10/2020 |
| KR | 10-2198040 B1 | 1/2021 |
| KR | 10-2021-0016228 A | 2/2021 |
| KR | 10-2230615 B1 | 3/2021 |
| WO | WO 2016/132586 A1 | 8/2016 |
| WO | WO 2019/220906 A1 | 11/2019 |

OTHER PUBLICATIONS

International Search Report dated Dec. 21, 2022 for Application No. PCT/KR2022/013356 with an English translation.
Korean Notice of Allowance dated Apr. 5, 2024 for Application No. 10-2022-0112689 with an English translation.
Korean Office Action dated Nov. 2, 2023 for Application No. 10-2022-0112689 with an English translation.

* cited by examiner

ENERGY STORAGE SYSTEM INCLUDING NEWLY INSTALLED BATTERY RACKS AND METHOD FOR CONTROLLING THE SAME

CROSS REFERENCE TO RELATED APPLICATION

This application claims priority to and the benefit of Korean Patent Application No. 10-2021-0119406 filed in the Korean Intellectual Property Office on Sep. 8, 2021, the entire contents of which are incorporated herein by reference.

TECHNICAL FIELD

The present invention relates to an energy storage system and a method for controlling the energy storage system, and more particularly, to an energy storage system including new or later installed battery racks and a method for controlling the energy storage system including the new or later installed battery racks.

BACKGROUND ART

An energy storage system relates to various technology, including renewable energy, a battery that stores electric power, and grid power. Recently, as research into smart grid and renewable energy is expanding and the efficiency and the stability of the power system are emphasized, a demand for energy storage systems for power supply and demand control, and power quality improvement is increasing. Depending on a purpose of use, energy storage systems may have different output and capacity. In order to configure a large-capacity energy storage system, a plurality of battery systems may be connected to provide the large-capacity energy storage system.

In an energy storage system, the performance of some battery racks may deteriorate over time, and accordingly, new battery racks may be added to existing battery racks so as to supplement the performance of the existing battery racks. However, performance difference may exist between a newly added battery rack and an existing battery rack, and thus, unnecessary rack balancing may be repeated due to the performance difference among the new and existing battery racks. Here, a problem arises that the new battery racks may follow the performance of the existing battery racks even though the new battery racks are added for performance compensation of the existing battery rack. In other words, even though new battery racks are added, the maximum performance (e.g. nominal capacity, period of use, etc.) possessed by the new battery racks cannot be fully utilized.

SUMMARY

Technical Problem

Accordingly, example embodiments of the present disclosure are provided to substantially obviate one or more problems due to limitations and disadvantages of the related art.

Embodiments of the present disclosure provide an energy storage system including one or more existing battery rack and one or more new battery rack.

Embodiments of the present disclosure also provide an apparatus for controlling a battery system, the battery system including one or more existing battery rack and one or more new battery rack.

Embodiments of the present disclosure also provide a method for controlling an energy storage system including one or more existing battery rack and one or more new battery rack.

Technical Solution

In order to achieve the objective of the present disclosure, an energy storage system may include a plurality of first battery racks, a plurality of battery protection units configured to manage the plurality of first battery racks respectively, a plurality of second battery racks, a plurality of DC/DC converters configured to manage the plurality of second battery racks respectively, and a battery section controller configured to monitor outputs of the plurality of battery protection units and outputs of the plurality of DC/DC converters, and to control the outputs of the plurality of DC/DC converters.

In the embodiment, the battery section controller may be configured to detect output power values of the plurality of first battery racks which operate in accordance with a charge or discharge command, and to calculate output power values to be output by the second battery racks based on at least one of the outputs of the plurality of first battery racks, information about the plurality of first battery racks, and information about the plurality of second battery racks.

Here, the information about the plurality of second battery racks may include at least one of a number of the second battery racks, state of health (SOHs), state of charges (SOCs), output currents, output powers, and temperatures of the second battery racks.

In addition, the battery section controller may be configured to calculate an output weight for each second battery rack using the information about the plurality of second battery racks.

The battery section controller may also be configured to calculate a total power command value for the plurality of second battery racks based on the output power values of the plurality of first battery racks and the plurality of second battery racks, a quantity information of the plurality of first battery racks, and a quantity information of the plurality of second battery racks.

The battery section controller may be configured to calculate an individual power command value for each of the plurality of second battery racks based on the output weight for each second battery rack and the total power command value.

The battery section controller may stop the outputs of the plurality of DC/DC converters when an output command from a power conversion system indicates to stop a charge/discharge operation.

The charge or discharge command may be transmitted from an energy management system to a power conversion system of the energy storage system.

The plurality of second battery packs may be managed only by the plurality of DC/DC converters among the plurality of battery protection units and the plurality of DC/DC converters.

According to another embodiment of the present disclosure, a battery system controller, which is connected to a plurality of battery protection units managing a plurality of first battery racks respectively and is connected to a plurality of DC/DC converters managing a plurality of second battery racks respectively, may include at least one processor, and a memory configured to store at least one instruction executed by the at least one processor, wherein the at least one instruction may include an instruction to monitor outputs of the plurality of battery protection units and outputs of the plurality of DC/DC converters, and an instruction to control the outputs of the plurality of DC/DC converters based on a monitoring result.

The instruction to monitor outputs of the plurality of battery protection units and outputs of the plurality of DC/DC converters may include an instruction to detect output power values of the plurality of first battery racks which operate in accordance with a charge or discharge command.

The instruction to control the outputs of the plurality of DC/DC converters based on the monitoring result may include an instruction to calculate the output power values to be output by the second battery racks based on the outputs of the plurality of battery protection units, information about the plurality of first battery racks, and information about the plurality of second battery racks.

The instruction to control the outputs of the plurality of DC/DC converters based on the monitoring result may include an instruction to calculate a total power command value for the plurality of second battery racks based on the output power values of the plurality of first battery racks and the plurality of second battery racks, a quantity information of the plurality of first battery racks, and a quantity information of the plurality of second battery racks, and an instruction to calculate an individual power command value for each of the plurality of second battery racks based on the output weight for each second battery rack and the total power command value.

The battery system controller may monitor the charge or discharge command that is transmitted from an energy management system to a power conversion system.

According to another embodiment of the present disclosure, a method for controlling an energy storage system is provided where the energy storage system includes a plurality of first battery racks, a plurality of battery protection units configured to manage the plurality of first battery racks respectively, a plurality of second battery racks, a plurality of DC/DC converters configured to manage the plurality of second battery racks respectively. The method may include monitoring outputs of the plurality of battery protection units and outputs of the plurality of DC/DC converters using a battery system controller (BSC), detecting output power values of the plurality of first battery racks which operate in accordance with a charge or discharge command, and calculating output power values to be output by the second battery racks based on at least one of the outputs of the plurality of first battery racks, information about the plurality of first battery racks, and information about the plurality of second battery racks.

The calculating output power values to be output by the second battery racks may include calculating a total power command value for the plurality of second battery racks based on the output power values of the plurality of first battery racks and the plurality of second battery racks, a quantity information of the plurality of first battery racks, and a quantity information of the plurality of second battery racks, and calculating an individual power command value for each of the plurality of second battery racks based on the output weight for each second battery rack and the total power command value.

Here, the information about the plurality of second battery racks may include at least one a number of the second battery racks, State of Healths (SOHs), State of Charges (SOCs), output currents, output powers, and temperatures of the plurality of second battery racks.

The method for controlling an energy storage system may further comprise stopping the outputs of the plurality of DC/DC converters when an output command from a power conversion system indicates to stop charge/discharge operation.

The charge or discharge command may be transmitted from an energy management system to a power conversion system.

Advantageous Effects

According to embodiments of the present disclosure, unnecessary or excessive rack balancing can be avoided or reduced when new battery racks are added to an existing energy storage system having existing battery racks.

Accordingly, the performance of new battery racks can be utilized to the fullest (e.g., 100%).

In addition, the existing energy storage system can be operated with existing methods by modifying only a firmware of the battery section controller without modifying a firmware of an existing power conversion system and an existing power management system.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is amendable to various modifications and alternative forms, specific embodiments thereof are shown by way of example in the drawings and will herein be described in detail. It should be understood, however, that there is no intent to limit the invention to only the particular forms or embodiments disclosed, but on the contrary, the invention is to cover all modifications, equivalents, and alternatives falling within the spirit and scope of the invention. Like numbers refer to like elements throughout the description of the figures.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Some terms used herein are defined as follows.

State of Charge (SOC) refers to a current state of charge of a battery, represented in percent points [%], and State of Health (SOH) may be a current condition of a battery compared to its ideal or original conditions, represented in percent points [%].

A battery rack refers to a system of a minimum single structure assembled by connecting module units in series/parallel, module units being set by a battery manufacturer. A battery rack can be monitored and controlled by a battery management system (BMS). A battery rack may include several battery modules and a battery protection unit or any other protection device.

A battery bank refers to a group of large-scale battery rack systems configured by connecting several racks in parallel. A bank BMS for a battery bank may monitor and control several rack BMSs, each of which manages a battery rack.

A battery section controller (BSC) refers to a device that controls the topmost level of a battery system including a battery bank level structure or a multiple bank level structure. A battery section controller may also be referred to a battery system controller.

A nominal capacity (Nominal Capa.) refers to a capacity [Ah] of a battery set during development by a battery manufacturer.

Hereinafter, exemplary embodiments of the present invention will be described in detail with reference to the accompanying drawings.

Figure 1:
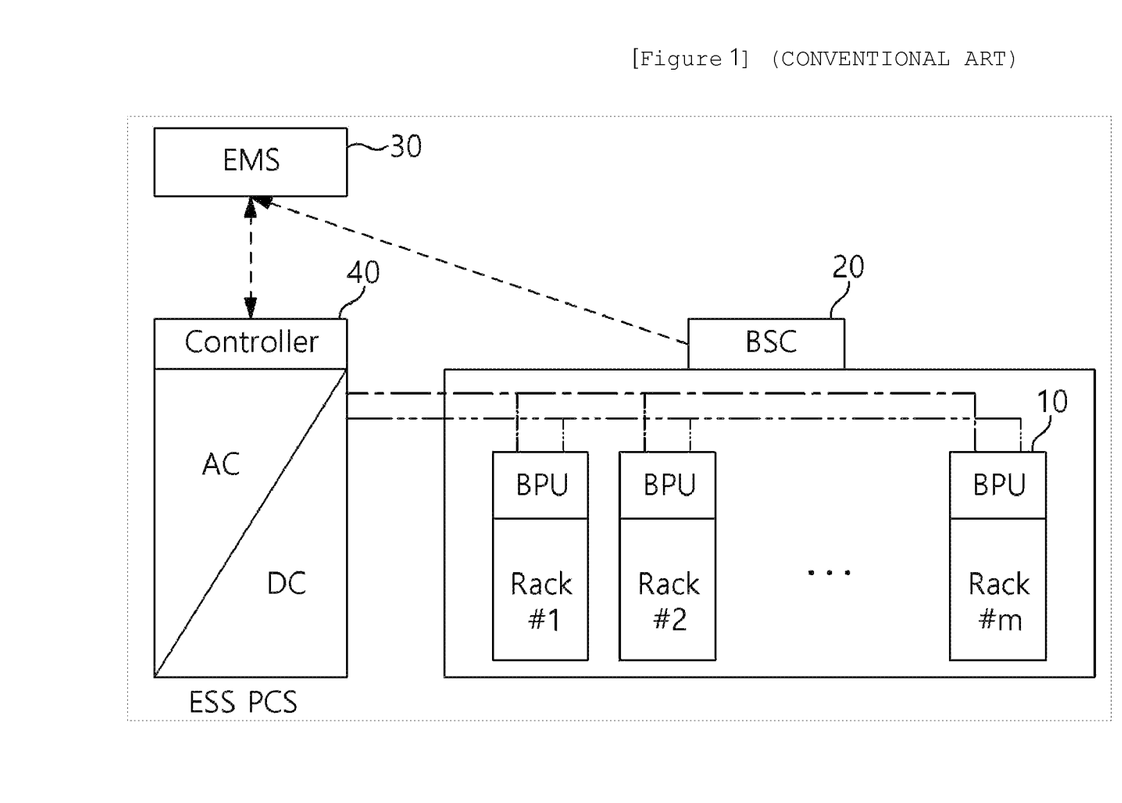
FIG. 1 is a block diagram of a conventional energy storage system.

FIG. 1 is a block diagram of a conventional energy storage system.

In an energy storage system (ESS), typically a battery cell is a minimum unit of storing energy or power. A series/parallel combination of battery cells may form a battery module, and a plurality of battery modules may form a battery rack. In other words, a battery rack can be a minimum unit of a battery system as a series/parallel combination of battery modules. Here, depending on a device or a system in which the battery is used, a battery rack may be referred to as a battery pack.

Referring to FIG. 1, a battery rack may include a plurality of battery modules and a battery protection unit (BPU) 10 or any other protection device. The battery rack can be monitored and controlled through a rack BMS(RBMS). The RBMS may monitor a current, a voltage and a temperature, among others, of each battery rack to be managed, calculate a State Of Charge (SOC) of the battery based on monitoring results, and control charging and discharging of the battery rack.

The battery protection unit (BPU) 10 is a device for protecting the battery rack from an abnormal current and a fault current in the battery rack. The BPU may include a main contactor (MC), a fuse, a circuit breaker (CB) or a disconnect switch (DS). The BPU 10 may control a battery system rack by rack through on/off controlling the main contactor (MC) based on a control from the Rack BMS. The BPU 10 may also protect the battery rack from a short circuit current using a fuse in the event of a short circuit. As such, the battery system can be controlled through a protection device such as a BPU 10 or a switchgear.

A battery section controller (BSC) 20 is located in each battery section which includes a plurality of batteries, peripheral circuits, and devices to monitor and control objects such as a voltage, a current, a temperature, and a circuit breaker. The battery section controller 20 is an uppermost control device in a battery system including at least one battery bank with a plurality of battery packs. The battery section controller 20 may also be used as a control device in a battery system having a plurality of bank level structures.

A power conversion system (PCS) 40 installed in each battery section performs charging/discharging based on a charge/discharge command (e.g., a charge or discharge command) from the energy management system (EMS) 30. The power conversion system (PCS) 40 may include a power conversion unit (DC/AC inverter) and a controller. The output of each BPU 10 may be connected to the PCS 40 through a DC bus, and the PCS 40 may be connected to a power grid. In addition, the EMS (or Power Management System (PMS)) 30 may manage the overall energy storage system (ESS).

In a conventional battery system as shown in FIG. 1, the battery system is managed only through protection elements such as a BPU and a switch gear. Thus, it is impossible to control the battery system based on individual characteristics of a battery rack or battery pack, such as battery capacity, SOH, and SOC.

In such an energy storage system, a plurality of battery racks may serve as voltage sources, and the PCS charges and discharges the battery racks using a constant current (CC) control method or a constant power (CP) control method. At the initial installation of the battery racks, the performances of battery racks are almost similar (if expressed in equivalent resistance, showing similar resistance values), and the charge/discharge current of each rack appears in a similar level. However, some racks may experience degradation over time. In this instance, new racks can be added to the existing energy system so as to supplement the system performance, which may be referred to as augmentation.

Here, there may be a performance difference between newly added battery racks (also referred to as second battery racks) and existing battery racks (also referred to as first battery racks), which may cause repeated and unnecessary (or excessive) rack balancing according to an existing control method, and thus, the newly added battery racks eventually follow the degraded performance of the existing battery racks. Therefore, even though new battery racks are added, the maximum performance (e.g., nominal capacity, period of use, etc.) of the new battery racks cannot be fully utilized. In embodiments of the present invention, reference to new battery racks includes battery racks that are of new manufacture, but may also include battery racks that are used to augment the existing battery racks at a later point in time that includes a DC/DC converter for DC/DC conversion, and may have been previously used and/or refurbished.

Figure 2:
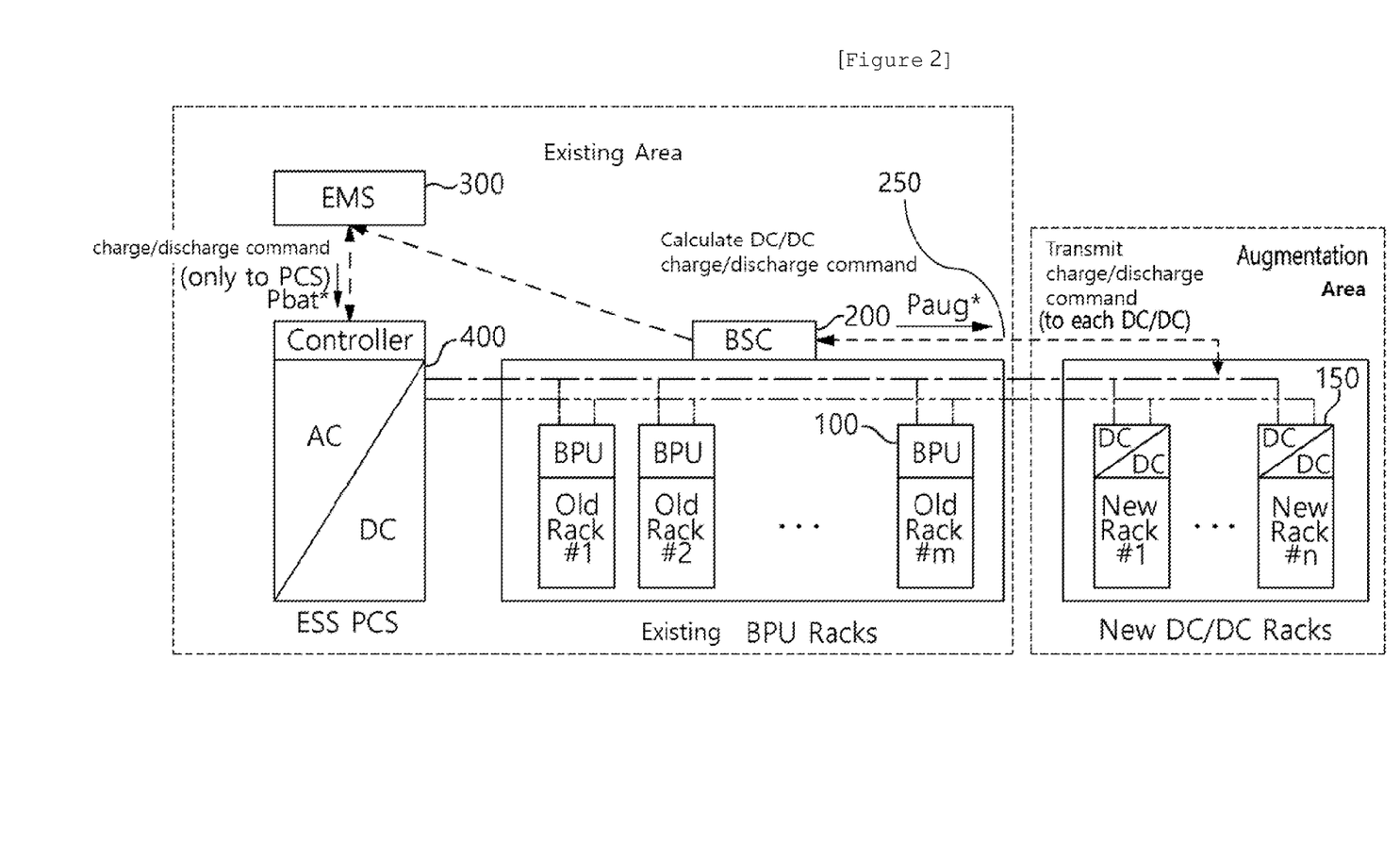
FIG. 2 is a block diagram of an energy storage system according to embodiments of the present invention.

FIG. 2 is a block diagram of an energy storage system according to embodiments of the present invention.

FIG. 2 shows the energy storage system in which a plurality of new battery racks are added to an existing energy storage system that was previously being operated. In embodiments of the present invention, an existing energy storage system may include elements similar to the energy storage system shown in FIG. 1.

The existing energy storage system may include an energy management system (EMS) 300, a power conversion system (PCS) 400, battery protection units (BPUs) 100, battery racks (old Racks), and a battery section controller (BSC) 200. The battery section controller (BSC) 200 may have attributes similar to the BSC 20 as described with reference to FIG. 1. An energy management system (EMS) may also be referred to as a power management system (PMS), and may manage the energy storage system (ESS).

The battery section controller (BSC) 200 may play a role in managing a state of each battery rack and informing a supervising system (e.g. EMS) of an output limit of each battery rack. The battery section controller (BSC) 200 may be implemented in a form of being mounted and installed on a desktop personal computer (PC) or the like. But such is not required, and a separate device or controller may be used to implement the BSC 200. The power conversion system 400 may perform charging/discharging based on charge/discharge commands from the EMS 300. The power conversion system 400 may include a DC/AC power converter and a controller.

When an augmentation is implemented in which one or more new battery racks (New Racks) are added to supplement a plurality of battery racks (Old Racks) and BPUs 100 operated previously, that is, when existing battery racks (Old Racks) and new battery racks (New Racks) coexist by augmentation, the performance of the new battery racks may deteriorate rapidly or a balancing problem among battery racks may occur in the instance the energy storage system is managed by an existing control method that had managed the existing battery racks.

Therefore, the energy storage system according to embodiments of the present invention may use a DC/DC converter 150 exclusively for a newly added battery rack (New Rack) in the augmentation area instead of a battery protection unit (BPU) and avoid or reduce rapid deterioration of the newly added battery rack or a balancing problem among battery racks.

The DC/DC converter 150 may include a main body and a DC/DC controller. The DC/DC converter 150 may perform DC/DC conversion between a new battery rack (New Rack) and the power conversion system (PCS) 400.

The DC/DC converter 150 arranged in the augmentation area allows the existing battery racks (Old Racks) in the existing area and the new battery racks (New Racks) in the augmentation area to be electrically separated and operated. The output of the DC/DC converter 150 can be actively controlled. Thus, even if there is a difference in SOC, SOH, and capacity among the existing battery racks (Old Racks) and the new battery racks (New Racks), it is possible to control the battery output considering the characteristics of each battery rack.

Each DC/DC converter 150 is connected to the BSC 200 and the PCS 400. The BSC 200 may monitor and manage states of the new battery racks (New Racks) with the DC/DC converters 150 and which are disposed in the augmentation area as well as the existing battery racks (Old Racks) with the BPUs 100 and which are disposed in the existing area.

Meanwhile, from a point of view of an end user who use services provided by the energy storage system (ESS), whether batteries can be operated without changing the existing PCS and EMS is one of importance for interoperability and convenience.

The present invention provides an augmentation technique using a DC/DC converter by modifying only a BSC firmware at a battery area, without modifying any firmware of the PCS or the EMS.

In embodiments of the present invention, the new battery racks (New Racks) in the augmentation area, and used for augmenting the existing battery racks (Old Racks), may only have the DC/DC converters 150 and not the BPUs 100. Therefore, use a DC/DC converter 150 exclusively for a newly added battery rack (New Rack) in the augmentation area instead of a battery protection unit (BPU) may provide an advantage of avoiding or reducing rapid deterioration of the newly added battery rack or a balancing problem among battery racks, and may provide an advantage of modifying only a BSC firmware at a battery area, without modifying any firmware of the PCS or the EMS.

To further explain the augmentation technique, a start-up sequence of an energy storage system according to embodiments of the present invention will be described.

Referring to FIG. 2, the EMS 300 may transmit a charge/discharge command for an output power (Pbat*) to the PCS 400. The PCS 400 may receive the charge/discharge command (Pbat*) and may direct output of an output power (Pbat*) corresponding to the charge/discharge command (Pbat*). At this moment, the output power (Pbat*) corresponding to the charge/discharge command (Pbat*) may be outputted first (temporarily or for a short time frame) from BPU racks (including the BPU 100 and the existing battery racks (Old Racks)) arranged in the existing area.

Here, the BSC 200 may be aware of a quantity information such as how many of the BPU racks may be arranged in the existing area and how many of the DC/DC racks (including new battery racks (New Racks) and DC/DC converters 150) are arranged in the augmentation area. The BSC 200 may monitor the total output power (Pbat*) from all existing battery racks (Old Racks) connected with the BSC 200. Accordingly, Pbat* refers to a total output power that is demanded from the BPU racks in the existing area and the DC/DC racks in the augmentation area.

Meanwhile, the BSC 200 may calculate an augment power having an output value Paug* to be output by the new battery racks (New Racks) in the augmentation area based on at least the total output power Pbat* of the existing battery racks (BPU Racks or Old Racks) in the existing area and the new battery racks (DC/DC racks or new racks) in the augmentation area, the quantity information of the existing battery racks (BPU racks or Old Racks), and the quantity information of the new battery racks (DC/DC racks or New Racks).

Furthermore, the BSC 200 may calculate an output weight for each new battery rack (New Rack) based on a state information (SOC, SOH, etc.) of each new battery rack (New Rack) located in the augmentation area. By multiplying an output weight for each new battery rack (New Rack) by the output value Paug*, a weighted output value of each individual DC/DC rack can be calculated. In other words, the BSC 200 may calculate the output value Paug* to be generated based on a charge/discharge command (Paug*) for the DC/DC converters 150 based on a residual energy of the DC/DC racks of the new battery racks (New Rack) compared to the BPU racks of the existing battery racks (Old Racks). The calculated charge/discharge command Paug* for each DC/DC converter 150 may be transmitted to each DC/DC converter 150 through a communication line 250, and the DC/DC racks collectively output the augment power having the output value Paug* corresponding to the charge/discharge command (Paug*). In embodiments of the present invention, the charge/discharge command for output power Pbat* may also be referred to as a Directive for Output Power Pbat*. In this regard, the charge/discharge command for output power may be expressed or symbolized by a value of the output power Pbat* that is demanded or required by the charge/discharge command that results in the output power Pbat*. Accordingly, Pbat* may be used to express the charge/discharge command and the output power depending on the context. In a similar manner, a charge/discharge command for output value Paug* may also be referred to as a Directive for Output Value Paug*. In this regard, the charge/discharge command for output value may be expressed or symbolized by a value of the output value Paug* that is demanded or required by the charge/discharge command that results in the output value Paug* Accordingly, Paug* may be used to designate the charge/discharge command and the output value depending on context.

Next, a stop sequence of the energy storage system will be described.

When the energy storage system (ESS) is stopped or to be stopped, the output of PCS 400 becomes 0. At this moment, since the existing BPU area, which is in the existing area, relates to passive elements, the output of the battery racks therein changes according to the PCS output. However, the DC/DC area, which is in the augmentation area, operates under control of the BSC 200, and thus, the output value Paug* is maintained momentarily. In other words, for a very short moment such as less than 1 second to 1 millisecond, for example, the augmentation area may output the output value Paug* and the existing BPU area may temporarily accept the corresponding output. In the meantime, the BSC 200 may detect that the output toward the PCS 400 has become 0, and correct the DC/DC area output command value (Paug*) corresponding to the output value Paug* to 0. Through this process, the output of all racks in the existing BPU area and the DC/DC area becomes 0, and the system operation stops.

Figure 3:
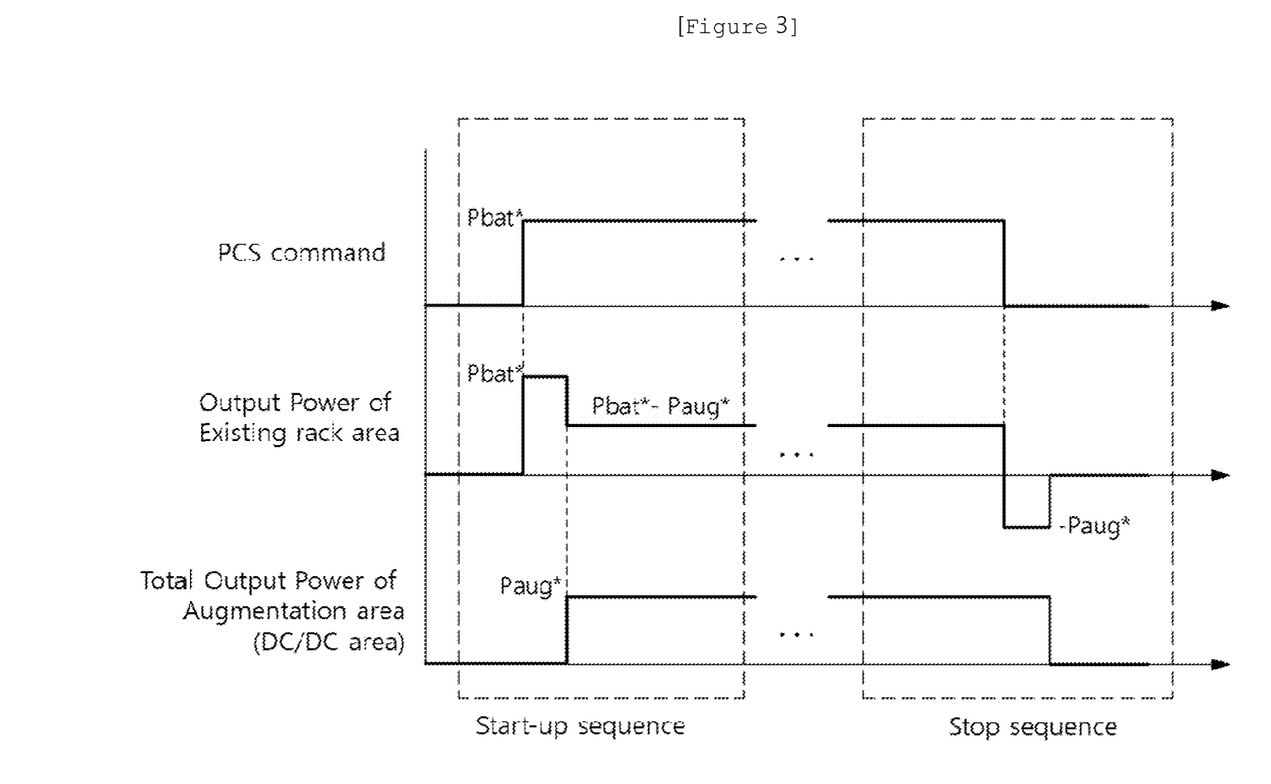
FIG. 3 illustrates a relationship between an output command value and output values in each of an existing area and an augmentation area when the energy storage system is started and stopped according to embodiments of the present invention.

FIG. 3 illustrates a relationship between an output command value and an output value in each area when the energy storage system is started and stopped according to embodiments of the present invention.

In a startup sequence, when the total output power of Pbat* is to be output from the energy storage system, the output power of Pbat* is first output from batteries of the old battery racks (Old Racks) in the existing area through the PCS 400 that receives a charge/discharge command (Pbat*) from the EMS 300, the BSC 200 may recognize the output power Pbat* provided from the batteries of the old battery racks (old Racks) in the existing area and calculate the output value Paug* to be output by batteries of the new battery racks (New Racks) in the augmentation area to augment the batteries of the old battery racks in order to provide or continually provide the total output power of Pbat*. The charge/discharge command for the calculated output value Paug* may then be delivered to the augmentation area.

When the augmentation area outputs the output value of Paug* based on the charge/discharge command for the calculated output value Paug*, the batteries of the old battery racks (Old Racks) in the existing area starts outputting power of (Pbat*−Paug*) (i.e., the difference between the output power Pbat* and the output value Paug*) because of the provision of the output value Paug* from the batteries of the new battery racks (New Racks) in the augmentation area. Here, the value of the total output value of the PCS 400 is maintained as Pbat*, because the EMS 300 transmits a constant command value for the output power of Pbat* to the PCS 400 regardless of whether or not an augmentation has been performed. As described above, according to the present invention, the PCS 400 and the EMS 300 can operate without change of their original operations regardless of augmentation.

On the other hand, in a stop sequence, the command value for the output value of the PCS 400 becomes 0 due to a system stop. Since the existing BPU area relates to passive elements, the output of the existing battery racks (Old Racks) in the existing BPU area changes according to the output of the PCS 400. The DC/DC area, which is an augmentation area, may maintain the output value Paug* until receiving a command from the BSC 200 and control the output to 0 upon receiving a stop command from the BSC 200. For a short time during which the augmentation area outputs the output value Paug*, the existing BPU area temporarily accepts the corresponding output value (−Paug*). When the output of the DC/DC area becomes 0 by the stop command from the BSC, the output of the existing BPU area also becomes 0.

Figure 4:
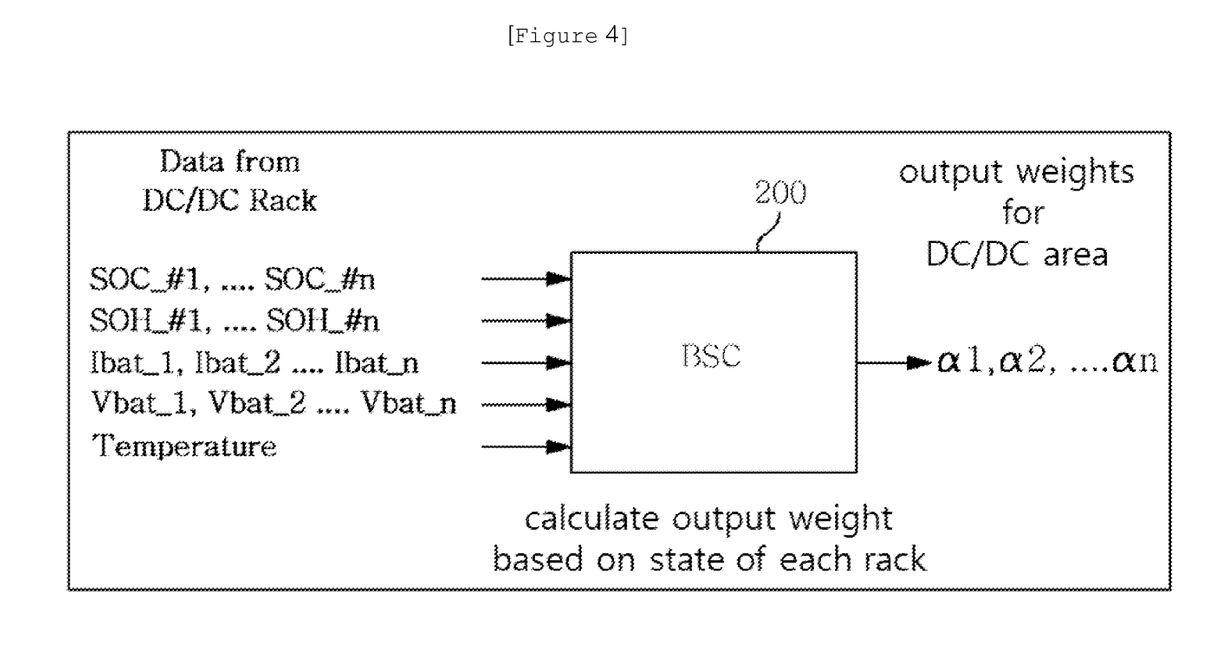
FIG. 4 illustrates a concept of calculating an output control weight for each DC/DC converter in the augmentation are according to embodiments of the present invention.

FIG. 4 illustrates a concept of calculating an output control weight for each DC/DC converter 150 in an augmentation area according to embodiments of the present invention.

According to an embodiment of the present invention, the BSC 200 may estimate a state of each new battery rack based on information, such as SOC and SOH of the new battery racks (New Racks) in the augmentation area and calculate an output weight for each DC/DC rack based on the state of each DC/DC rack.

Specifically, referring to FIG. 4, the BSC 200 may receive data, such as SOC, SOH, current, voltage and temperature of each new battery rack (New Rack) from each DC/DC rack.

The BSC 200 may use this data to calculate output weights $\alpha_1, \alpha_2, \ldots, \alpha_n$ for each DC/DC rack, respectively.

Equation 1 below represents an equation for calculating a total output command value Paug* for the augmentation area. In embodiments of the present invention, a unit for the Pbat* and Paug* may be watt (W), for example.

$$P_{aug}^* = n/(m+n) \times P_{bat}^* \qquad \text{[Equation 1]}$$

In Equation 1, m represents a number (or a quantity) of BPU racks (old), and n may represents a number (or a quantity) of DC/DC racks (new). In addition, Pbat* represents output power corresponding to a charge/discharge command value Pbat* received from EMS 300.

Equation 2 represents an equation for calculating the individual output values $P_{DC/DC-1}^*$ to $P_{DC/DC-n}^*$ of the DC/DC racks in the augmentation area based on the output value Paug* corresponding to the command value Paug*.

$$P_{DC/DC-1}^* = \alpha_1 \times P_{aug}^* \qquad \text{[Equation 2]}$$
$$P_{DC/DC-2}^* = \alpha_2 \times P_{aug}^*$$
$$\vdots$$
$$P_{DC/DC-n}^* = \alpha_n \times P_{aug}^*$$
$$\alpha_1 + \alpha_2 + \ldots \alpha_n = 1$$

In Equation 2, the individual output value of the DC/DC rack may be calculated by multiplying the total output value of Paug* for the augmentation area by the output weight for each DC/DC rack. Here, a sum of all the output weights $\alpha$ of each DC/DC rack is 1.

The weight $\alpha$ that may be assigned to individual DC/DC racks may be determined as follows.

In one embodiment, it is assumed that the new battery racks (New Rack) in the augmentation area are battery racks of the same type. In this instance, batteries in the augmentation area of the same type and having similar SOH may have an output weight $\alpha_j$ of the new battery rack #j be defined with the following equation, when charging:

$$\alpha_j = \frac{(100 - SOC_{Rack\#1})}{\sum_{k=1}^{n}(100 - SOC_{Rack\#1})}. \qquad \text{[Equation 3]}$$

In the above equation 3, $(\Sigma_{i=0}^{n}(100\text{-}SOC_{Rack\ \#1})$ refers to an entire sum of a chargeable value of the entire new battery racks (New Racks) in the augmentation area, and (100-$SOC_{Rack\ \#j}$) refers to a chargeable value of #j new battery rack to which a corresponding output weight of a is applied, and n is a total number of the new battery racks in the augmentation area.

In addition, when the batteries in the augmentation area have similar SOH, the output weight of a for each new battery rack during a discharge may be determined as a ratio of the SOC of the corresponding new battery rack to the SOC of the entire new battery racks in the augmentation area. That is, it can be defined as the following equation:

$$\alpha_j = \frac{SOC_{Rack\#1}}{\sum_{k=1}^{n}(SOC_{Rack\#1})}. \qquad \text{[Equation 4]}$$

On the other hand, when the battery is of the same type but the new battery racks have different SOHs, the output weight $\alpha$ for each new battery rack can be determined by considering not only the SOC of each new battery rack but also the SOH of each new battery rack.

For example, the output weight $\alpha$ for each new battery rack during charging may be defined as follows:

$$\alpha_j = \frac{(100 - SOC_{Rack\#1}) \times SOH_{Rack\#1}}{\sum_{k=1}^{n}((100 - SOC_{Rack\#1}) \times SOH_{Rack\#1})}. \qquad \text{[Equation 5]}$$

In addition, the output weight for each battery rack during discharge may be defined as follows:

$$\alpha_j = \frac{SOC_{Rack\#1} \times SOH_{Rack\#1}}{\sum_{k=1}^{n}(SOC_{Rack\#1} \times SOH_{Rack\#1})}. \qquad \text{[Equation 6]}$$

In the above equations, n, i and j can be integers.

Accordingly, an amount of augment power to be supplied by an individual new battery rack #j may be provided by the output weight output weight $\alpha_j$ of the new battery rack #j, and the output weight may be included in the charge/discharge command (Paug*).

In embodiments of the present invention, a total power command value for the plurality of second battery racks may be calculated by multiplying the output power values of the plurality of first battery racks to a ratio of the number of the plurality of second battery racks to a total number of battery racks in the energy storage system. Also, an individual power command value for each of the plurality of second battery racks can be calculated based on the output weight for each second battery rack and the total power command value.

Figure 5:
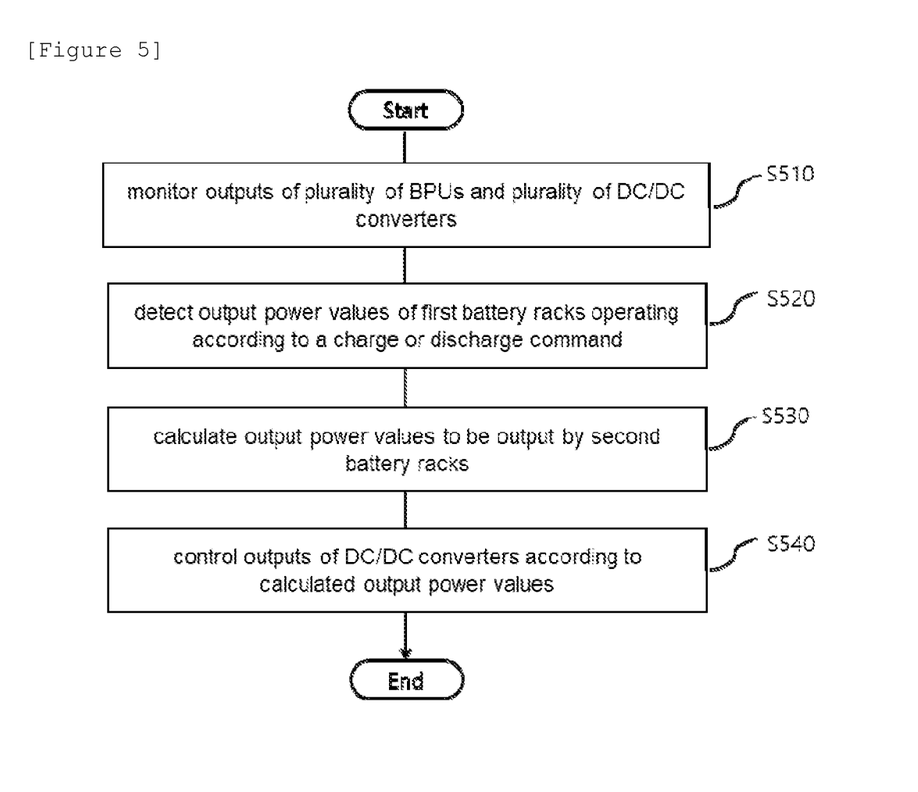
FIG. 5 is a flowchart of a method for controlling an energy storage system according to embodiments of the present invention.

FIG. 5 is a flowchart of a method for controlling an energy storage system according to embodiments of the present invention.

The control method of the energy storage system according to the present invention may be performed by a battery section controller in an energy storage system, the energy storage system including a plurality of first battery racks; a plurality of battery protection units configured to manage the plurality of first battery racks respectively; a plurality of second battery racks; a plurality of DC/DC converters configured to manage the plurality of second battery racks respectively.

The battery section controller may monitor the outputs of the plurality of battery protection units and the plurality of DC/DC converters (operation S510).

The battery section controller may detect the output power values of the plurality of first battery racks operating according to a charge or discharge command of the energy storage system (operation S520).

Thereafter, the battery section controller calculates output power values to be output by the plurality of second battery racks (operation S530). Here, the output power values to be output by the second battery racks may be calculated using the output power values of the plurality of first battery racks, information about the plurality of first battery racks, and information about the plurality of second battery racks. More specifically, in the operation of calculating the output power values to be output by a plurality of second battery racks, an output weight for each second battery rack can be calculated using information about the plurality of second battery racks. In this operation, the power command value for each of the second battery racks can be calculated based on the output weight for each second battery rack and the number of the second battery racks compared to the total number of battery racks in the energy storage system. Here, the information about the plurality of second battery racks includes one or more of the number of the plurality of second battery racks, SOHs, SOCs, output currents, output powers, and temperatures of second battery racks.

Thereafter, the outputs of the plurality of DC/DC converters may be controlled according to the calculated output power value (operation S540).

Figure 6:
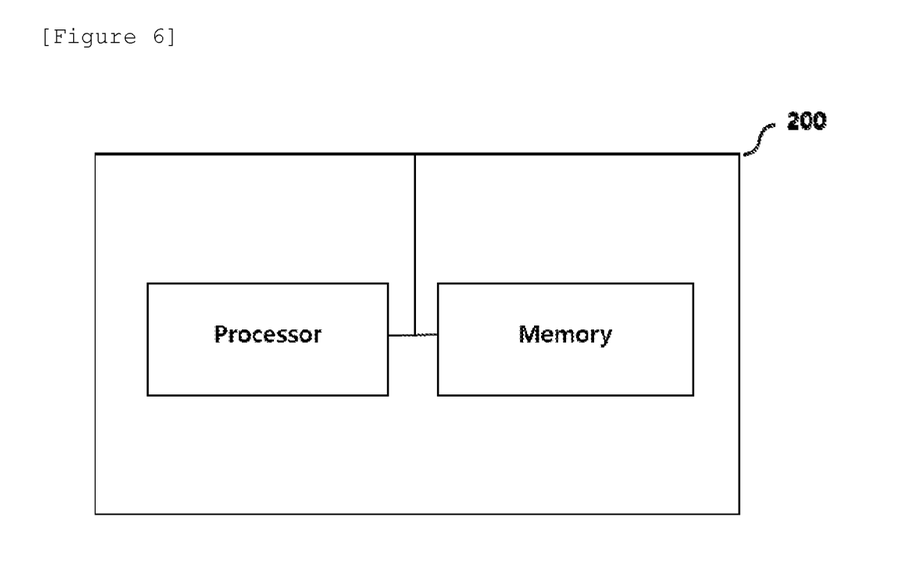
FIG. 6 is a schematic drawing of a battery section controller according to embodiments of the present invention.

FIG. 6 is a schematic drawing of a battery section controller according to embodiments of the present invention. The battery section controller 200 may include at least one processor, a memory configured to store at least one instruction executed by the at least one processor. The at least one instruction may be an instruction to monitor outputs of the plurality of battery protection units and outputs of the plurality of DC-DC DC/DC converters, and an instruction to control the outputs of the plurality of DC-DC DC/DC converters based on a monitoring result to augment the outputs of the plurality of battery protection units.

The embodiments of the present disclosure may be implemented as program instructions executable by a variety of computers and recorded on a computer readable medium that is non volatile. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as read-only-memory (ROM), random access memory (RAM), and flash memory, which are specifically configured to store and execute the program instructions. Examples of the program instructions include machine codes made by, for example, a compiler, as well as high-level language codes executable by a computer, using an interpreter. The above example hardware device can be configured to operate as at least one software module in order to perform the embodiments of the present disclosure, and vice versa.

While the example embodiments of the present invention and their advantages have been described in detail, it should be understood that various changes, substitutions and alterations may be made herein without departing from the scope of the invention.

The invention claimed is:

1. An energy storage system comprising:
a plurality of first battery racks;
a plurality of battery protection units configured to manage the plurality of first battery racks respectively;
a plurality of second battery racks;
a plurality of direct current/direct current (DC/DC) converters configured to manage the plurality of second battery racks respectively; and
a battery system controller configured to monitor outputs of the plurality of battery protection units and outputs of the plurality of DC/DC converters, and to control the outputs of the plurality of DC/DC converters,
wherein the plurality of second battery racks and the plurality of DC/DC converters are additionally installed in the energy storage system after the plurality of first battery racks are installed in the energy storage system, to augment the plurality of first battery racks,
wherein the plurality of first battery racks are not directly connected to the plurality of DC/DC converter so that outputs of the plurality of first battery racks to a load via an AC/DC converter cannot be controlled by any DC/DC converter between the plurality of first battery racks and the AC/DC converter based on characteristics of the plurality of first battery racks,
wherein the plurality of battery protection units control the plurality of first battery racks and not the plurality of second battery racks, and
wherein, when a total output power is to be output from the energy storage system based on a charge/discharge command, the battery system controller is further configured to control the plurality of second battery racks and the plurality of DC/DC converters that are additionally installed in the energy storage system after the plurality of first battery racks are installed in the energy storage system to output a calculated output value of power to augment an output power from the plurality of first battery racks and provide the total output power,
wherein, the battery system controller is further configured to control, in a startup sequence in an outputting of the total output power, the total output power to be initially supplied only from the plurality of first battery racks, and
wherein, the battery system controller is further configured to control, in a stop sequence in the outputting of the total output power, the total output power to be output from the energy storage system to be zero based on the charge/discharge command, and the plurality of second battery racks to continue to output the calculated output value of power to augment the output power from the plurality of first battery racks for a limited time to cause the plurality of first battery racks to receive and accept the calculated output power from the plurality of second battery racks for the limited time before supply of power is stopped.

2. The energy storage system of claim 1, wherein the battery system controller stops the outputs of the plurality of DC/DC converters when an output command from a power conversion system indicates to stop a charge/discharge operation.

3. The energy storage system of claim 1, wherein the plurality of second battery packs are managed only by the plurality of DC/DC converters among the plurality of battery protection units and the plurality of DC/DC converters.

4. The energy storage system of claim 1, wherein the battery system controller is configured to detect output power values of the plurality of first battery racks which operate in accordance with a charge or discharge command, and to calculate output power values to be output by the plurality of second battery racks based on at least one of the outputs of the plurality of battery protection units, information about the plurality of first battery racks, and information about the plurality of second battery racks.

5. The energy storage system of claim 4, wherein the information about the plurality of second battery racks includes at least one of a number of the plurality of second battery racks, state of healths (SOHs), state of charges (SOCs), output currents, output powers, and temperatures of the plurality of second battery racks.

6. The energy storage system of claim 4, wherein the charge or discharge command is transmitted from an energy management system to a power conversion system of the energy storage system.

7. The energy storage system of claim 4, wherein the battery system controller is configured to calculate an output weight for each second battery rack using the information about the plurality of second battery racks.

8. The energy storage system of claim 7, wherein the battery system controller is configured to calculate a total power command value for the plurality of second battery racks based on the output power values of the plurality of first battery racks and the plurality of second battery racks, a number of the plurality of first battery racks, and the number of the plurality of second battery racks.

9. The energy storage system of claim 8, wherein the battery system controller is configured to calculate an individual power command value for each of the plurality of second battery racks based on the output weight for each second battery rack and the total power command value.

10. A battery system controller which is connected to a plurality of battery protection units managing a plurality of first battery racks respectively, and is connected to a plurality of direct current/direct current (DC/DC) converters managing a plurality of second battery racks respectively, the battery system controller comprising:
  at least one processor; and
  a memory configured to store at least one instruction executed by the at least one processor,
  wherein the at least one instruction includes:
  an instruction to monitor outputs of the plurality of battery protection units and outputs of the plurality of DC/DC converters; and
  an instruction to control the outputs of the plurality of DC/DC converters based on a monitoring result,
  wherein the plurality of second battery racks and the plurality of DC/DC converters that are additionally installed in the energy storage system after the plurality of first battery racks are installed in the energy storage system, to augment the plurality of first battery racks
  wherein the plurality of first battery racks are not directly connected to the plurality of DC/DC converters so that outputs of the plurality of first battery racks to a load via an AC/DC converter cannot be controlled by any DC/DC converter between the plurality of first battery racks and the AC/DC converter based on characteristics of the plurality of first battery racks,
  wherein the plurality of battery protection units control the plurality of first battery racks and not the plurality of second battery racks, and
  wherein, when a total output power is to be output from the energy storage system based on a charge/discharge command, the battery system controller is further configured to control the plurality of second battery racks and the plurality of DC/DC converters that are additionally installed in the energy storage system after the plurality of first battery racks are installed in the energy storage system to output a calculated output value of power to augment an output power from the plurality of first battery racks and provide the total output power,
  wherein, the battery system controller is further configured to control, in a startup sequence in an outputting of the total output power, the total output power to be initially supplied only from the plurality of first battery racks, and
  wherein, the battery system controller is further configured to control, in a stop sequence in the outputting of the total output power, the total output power to be output from the energy storage system to be zero based on the charge/discharge command, and the plurality of second battery racks to continue to output the calculated output value of power to augment the output power from the plurality of first battery racks for a limited time to cause the plurality of first battery racks to receive and accept the calculated output power from the plurality of second battery racks for the limited time before supply of power is stopped.

11. The battery system controller of claim 10, wherein the instruction to monitor the outputs of the plurality of battery protection units and the outputs of the plurality of DC/DC converters include an instruction to detect output power values of the plurality of first battery racks which operate in accordance with a charge or discharge command.

12. The battery system controller of claim 10, wherein the instruction to control the outputs of the plurality of DC/DC converters based on the monitoring result includes an instruction to calculate the output power values to be output by the plurality of second battery racks based on the outputs of the plurality of battery protection units, information about the plurality of first battery racks, and information about the plurality of second battery racks.

13. The battery system controller of claim 10, wherein the instruction to control the outputs of the plurality of DC/DC converters based on the monitoring result includes:
  an instruction to calculate a total power command value for the plurality of second battery racks based on the output power values of the plurality of first battery racks and the plurality of second battery racks, a number of the plurality of first battery racks, and a number of the plurality of second battery racks, and
  an instruction to calculate an individual power command value for each of the plurality of second battery racks based on the output weight for each second battery rack and the total power command value.

14. The battery system controller of claim 10, wherein the battery system controller monitors the charge or discharge command that is transmitted from an energy management system to a power conversion system.

15. A method for controlling an energy storage system, the energy storage system including a plurality of first battery racks, a plurality of battery protection units configured to manage the plurality of first battery racks respectively, a plurality of second battery racks, a plurality of direct current/direct current (DC/DC) converters configured to manage the plurality of second battery racks respectively, the method comprising:
  monitoring outputs of the plurality of battery protection units and outputs of the plurality of DC/DC converters using a battery system controller (BSC);
  detecting output power values of the plurality of first battery racks which operate in accordance with a charge or discharge command;
  calculating output power values to be output by the plurality of second battery racks based on at least one of outputs of the plurality of first battery racks, information about the plurality of first battery racks, and information about the plurality of second battery racks; and
  controlling the outputs of the plurality of DC/DC converters according to the calculated output power values,
  wherein the plurality of second battery racks and the plurality of DC/DC converters are additionally installed in the energy storage system after the plurality of first battery racks are installed in the energy storage system, to augment the plurality of first battery racks
  wherein the plurality of first battery racks are not directly connected to the plurality of DC/DC converters so that outputs of the plurality of first battery racks to a load via an AC/DC converter cannot be controlled by any DC/DC converter between the plurality of first battery racks and the AC/DC converter based on characteristics of the plurality of first battery racks, wherein the plurality of battery protection units control the plurality of first battery racks and not the plurality of second battery racks, and wherein, when a total output power is to be output from the energy storage system based on a charge/discharge command, the battery system controller is further configured to control the plurality of second battery racks and the plurality of DC/DC converters that are additionally installed in the energy storage system after the plurality of first battery racks are installed in the energy storage system to output a calculated output value of power to augment an output power from the plurality of first battery racks and provide the total output power, wherein, in a startup sequence in an outputting of the total output power, the total output power is initially supplied only from the plurality of first battery racks, and wherein, in a stop sequence in the outputting of the total output power, the total output power to be output from the energy storage system becomes zero based on the charge/discharge command, and the plurality of second battery racks continues to output the calculated output value of power to augment the output power from the plurality of first battery racks for a limited time which causes the plurality of first battery racks to receive and accept the calculated output power from the plurality of second battery racks for the limited time before supply of power is stopped.

16. The method of claim 15, wherein the calculating output power values to be output by the plurality of second battery racks includes:

calculating a total power command value for the plurality of second battery racks based on the detected output power values of the plurality of first battery racks and the calculated plurality of second battery racks, a number of the plurality of first battery racks, and a number of the plurality of second battery racks; and calculating an individual power command value for each of the plurality of second battery racks based on the output weight for each second battery rack and the total power command value.

17. The method of claim 15, wherein the information about the plurality of second battery racks includes at least one of a number of the plurality of second battery racks, State of Healths (SOHs), State of Charges (SOCs), output currents, output powers, and temperatures of the plurality of second battery racks.

18. The method of claim 15, further comprising:

stopping the outputs of the plurality of DC/DC converters when an output command from a power conversion system indicates to stop charge/discharge operation.

19. The method of claim 15, wherein the charge or discharge command is transmitted from an energy management system to a power conversion system.

* * * * *